US012330390B2

(12) United States Patent
Kaminski

(10) Patent No.: US 12,330,390 B2
(45) Date of Patent: Jun. 17, 2025

(54) METHOD FOR INFLATING AIRBAGS

(71) Applicant: Michael G Kaminski, Las Vegas, NV (US)

(72) Inventor: Michael G Kaminski, Las Vegas, NV (US)

(*) Notice: Subject to any disclaimer, the term of this patent is extended or adjusted under 35 U.S.C. 154(b) by 0 days.

(21) Appl. No.: 17/718,985

(22) PCT Filed: Mar. 21, 2021

(86) PCT No.: PCT/US2021/023373
§ 371 (c)(1),
(2) Date: Apr. 12, 2022

(87) PCT Pub. No.: WO2021/189030
PCT Pub. Date: Sep. 23, 2021

(65) Prior Publication Data

US 2023/0321942 A1 Oct. 12, 2023

Related U.S. Application Data

(63) Continuation of application No. 16/826,173, filed on Mar. 21, 2020, now Pat. No. 10,837,432.

(60) Provisional application No. 62/889,564, filed on Aug. 21, 2019.

(51) Int. Cl.
*B31D 5/00* (2017.01)
*B65D 81/05* (2006.01)

(52) U.S. Cl.
CPC .... *B31D 5/0073* (2013.01); *B31D 2205/0082* (2013.01); *B65D 81/052* (2013.01)

(58) Field of Classification Search
CPC .......... B31D 5/0073; B31D 2205/0082; B65D 81/052
USPC .......................................................... 141/313
See application file for complete search history.

(56) References Cited

U.S. PATENT DOCUMENTS

| | | | | |
|---|---|---|---|---|
| 11,220,082 | B2 * | 1/2022 | Kaminski | B65B 31/043 |
| 2003/0163976 | A1 * | 9/2003 | Perkins | B31D 5/0073 53/403 |
| 2005/0160699 | A1 * | 7/2005 | Perkins | B31D 5/0073 53/403 |
| 2007/0251190 | A1 * | 11/2007 | Daigle | B29C 66/9674 53/403 |
| 2017/0144402 | A1 * | 5/2017 | Liao | B65D 31/14 |
| 2019/0300215 | A1 * | 10/2019 | Liao | B65D 81/052 |

* cited by examiner

*Primary Examiner* — Jason K Niesz
(74) *Attorney, Agent, or Firm* — Barry Choobin; Patent 360

(57) ABSTRACT

A system and method for inflating airbags include a series of pulleys arranged in two parallel rows. Each pulley has its periphery defined as a semicircular concave groove that extends between two edges, wherein the semicircular concave grooves form a tunnel. Each pulley in the first row can rotate clockwise, while each pulley in the second row rotates anticlockwise. A cylindrical air tube can be positioned in the tunnel wherein the air tube is connected to a compressed air source at an end. The air tube has spaced apertures along its length and an airbag with two flaps can be mounted on the inflation system, wherein the two flaps are pressed over the air tube by the pair of pulleys and each pair of pulleys can drag the flaps on the air tube.

8 Claims, 7 Drawing Sheets

METHOD FOR INFLATING AIRBAGS

CROSS-REFERENCE TO RELATED APPLICATIONS

This application claims priority to PCT/US21/23373 filed on Mar. 21, 2021 which is Published claims the benefit of Ser. No. 16/826,173 filed on Mar. 21, 2020 which claims priority to a U.S. Provisional Patent Appl. Ser. No. 62/889,564 filed on Aug. 21, 2019, all of which are incorporated herein by reference in its entirety.

FIELD OF INVENTION

The present invention relates to a system and method for inflating airbags, and more particularly, the present invention relates to an automated system and method for inflating packaging airbags.

BACKGROUND

Packaging to protect an article from contamination, dirt, and damage are well known. The packaging is of utmost significance in the manufacture, sale, and transport of articles. The primary purpose of packaging is to protect an article from the environment. For example, the packaging can protect the article from dust, water, etc. Also, packaging has a primary function to protect an article from external shocks and bumps. This function of packaging is of importance in the transportation of fragile articles which are very prone to damage during transportation. Good packaging can protect an article from damage due to shocks and bumps during transportation and mishandling of an article.

Various kinds of packaging materials are commercially available, such as paper, plastic, and cardboard. Each packaging material has its own uses and indications. The paper can be used to protect an article from dirt. The plastic can protect an article from both dirt and liquid. Cardboards, on the other hand, are sturdy and can provide limited protection against shocks. For enhanced protection against the shocks, materials such as Styrofoam, foam, bubble packs, crumpled paper, and airbags are available that can insert inside a bag or container.

Airbags are bags that use air as a cushioning material to protect an article contained in the bag. The airbag can be manufacture from polyethylene or other similar materials that have comparable properties. The airbag can be manufacture as a sheet having two overlapping plies. The two plies have air cavities that can be inflate with air. The airbag can be manufacture in a form of a container. For example, airbag containers are used to hold glass bottles for protection against bumps. Such airbag containers have become quite popular for the transportation of wine bottles. At retail outlets, costly glass articles, such as wine bottles are pack in the airbag containers for protection against bumps. The airbag container is available as a sheet, which is inflate by a manual air pump. However, the use of manual pumps is both laborious and time-consuming. Thus, a need is appreciated for a system and method for automated inflation of the airbags.

Hereinafter the terms tubes, channels, chambers, and columns are interchangeably used and refer to an inflatable prolonged structure preferably made of flexible material.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an inflation system for automated inflating a series of airbags.

It is another object of the present invention directed to an inflatable airbag that can be filled by the disclosed inflation system.

It is an additional object of the present invention that the inflation system is economical and easy to use.

In one aspect, disclosed is an inflation system, an airbag, and a method for inflating the disclosed airbag using the disclosed inflation system. The inflation system includes a series of a pair of pulleys arranged in two parallel rows. Each pair of pulleys has a first pulley and a second pulley, wherein the first pulley is positioned in the first row and the second pulley is positioned in the second row. Each first pulley and the second pulley has its periphery configured with a semicircular concave groove that extends between two edges. Each pulley of the series of the pair of pulleys can connect to an electrical and mechanical source for rotating the pulleys and a control unit for regulating the speed of rotation. Each pulley in the first row rotates clockwise, and each pulley in the second row rotates anticlockwise. Also, all the pulleys rotate at the same speed. The inflation system further includes an elongated and cylindrical air tube that has a proximal end and a distal end. The proximal end of the air tube is closed, while the distal end is in fluid communication with a compressed air source. The air tube can rigidly be positioned between the first row and the second row. The air tube can have a plurality of spaced apart apertures at the bottom of the air tube and points in a downwards direction.

In one aspect, disclosed is an airbag that includes a first wall and a second wall. A first flap extends from the first wall and a second flap that extends from the second wall, wherein the first flap and the second flap face each other. Each the first wall and the second wall can have a series of inflatable tubes arranged side-by-side and perpendicular to a length of the first flap or the second flap. Each inflatable tube has an opening adjacent to the first flap or the second flap, the opening of each inflatable tube can be interrupted by a one-way valve, wherein the one-way valve allows air to enter the inflatable tube but prevents the leaking of air from the filled inflatable tubes.

In one aspect, the disclosed method includes the steps of putting the first flap and the second flap of the airbag around the proximal end of the air tube, such that the air tube is sandwiched between the first flap and the second flap. Thereafter, the ends of each the first flap and the second flap are bought into contact with a pair of pulleys that are adjacent to the proximal end of the air tube. Once, the flap contacts the rotating pulleys, each subsequent rotating pair of pulleys drag the flaps and thus the airbag, on the air tube, towards the distal end of the air tube.

These and other objects and advantages of the embodiments herein will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, the reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe specific embodiments only and is not intended to be limiting of embodiments of the invention. As used herein, the singular forms "a", "an" and "the" are intended to include the plural forms as well, unless the context indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Figure 1:
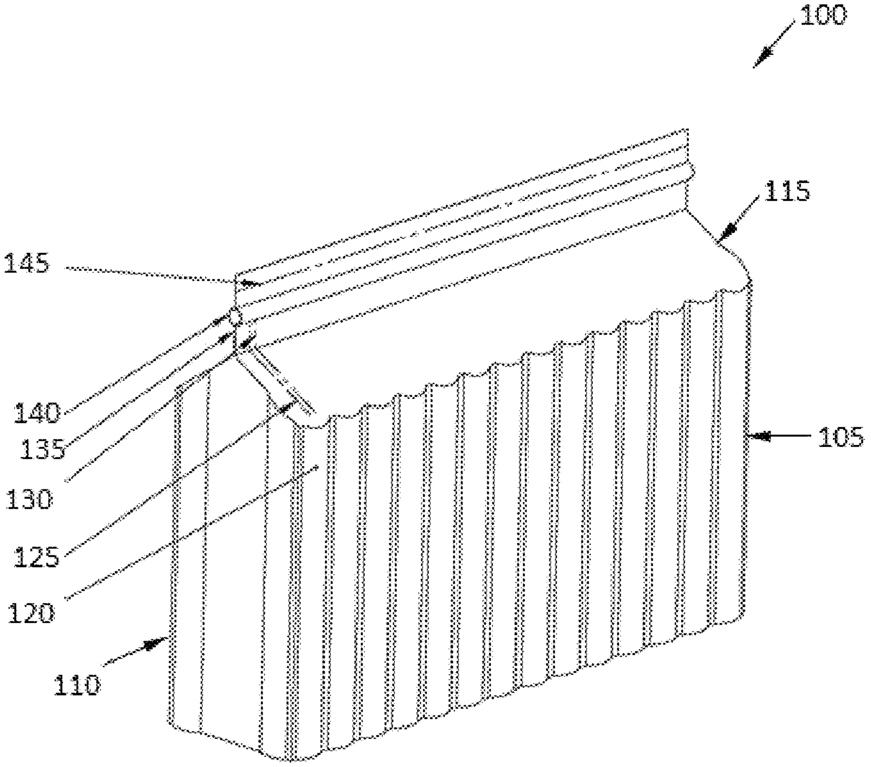
FIG. 1 is a perspective view of an airbag, according to an exemplary embodiment of the present invention.

Disclosed are an airbag, an inflation system, and a method for inflating the disclosed airbag using the disclosed inflation system. Referring to FIG. 1 shows an exemplary embodiment of the disclosed airbag. The airbag 100 is an inflatable airbag having a first wall 105 and an opposite rear wall (not shown). The front and rear walls can be bonded at their three edges forming an enclosed body. The top edges of the enclosed body can be open forming a mouth or opening of the bag to receive an item. A series of such bags can be manufactured as a continuous roll or a stack of fan-folded sheets. Each airbag of the series of airbags can be referred to hereinafter as a unit. Each unit in the roll or stack of sheets can be divided from adjacent units by a line of weakness, such that a unit can be torn from the rest of the airbag in series along with the line of weakness. In one case, the line of weakness can be spaced perforations.

Figure 2:
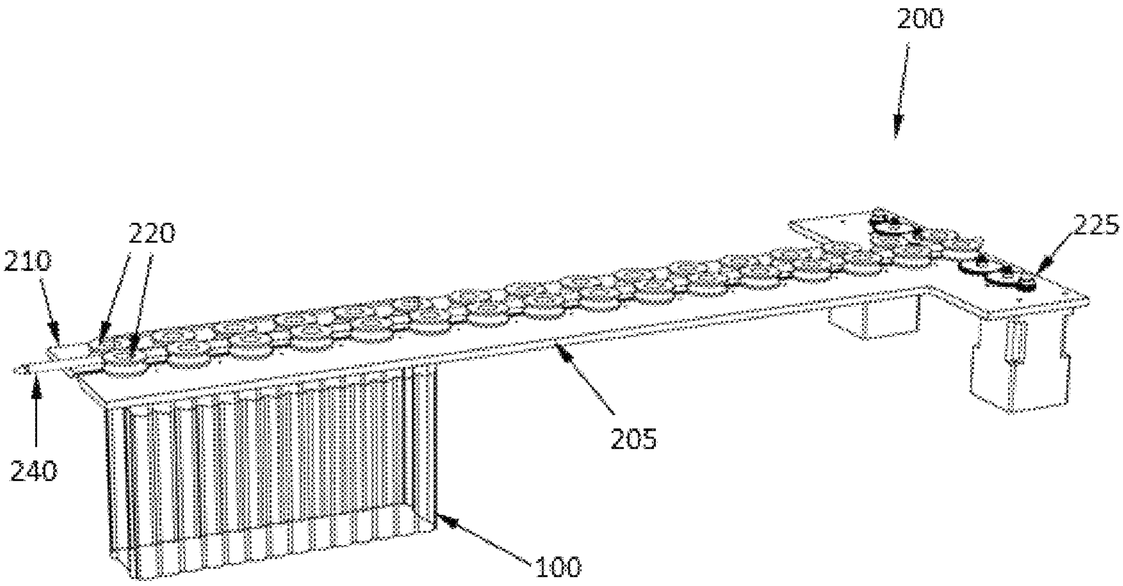
FIG. 2 is a perspective view showing the airbag mounted to an inflation system, according to an exemplary embodiment of the present invention.

Flaps extend from the edges of the front wall and the rear wall, the edges along with the opening of the airbag. FIG. 1 shows a first flap 115 that extends from the front wall 105. Similarly, a second flap extends from the rear wall 110. Both the first flap and the second flap face each other and can overlap, wherein the two flaps can be bonded to each other to close the opening of the bag. For example, the first flap and the second flap can be heat sealed after storing an article in the airbag. Each the front wall and the rear wall can include a series of inflatable tubes 120 of prolonged cylindrical configurations that are arranged side by side and perpendicular to the length of the flaps. Each inflatable tube can have an opening, preferably at its end. Each inflatable tube can end up to the flap and thereafter the opening of the tube can be configured as an inflation port. For example, the opening can be in the form of a slit or aperture through which air under pressure can be drawn into the series of air tubes resulting in their inflation. The opening of each inflatable tube can be interrupted by a check valve. The check valve, also known as a one-way-valve, can be configured at the opening of the inflatable tubes that allows air to fill into the tubes but does not allow the filled air from the tubes to leak out through the opening. The use of a check valve is advantageous in prolonging the life of the airbag and limiting the spread of any damage to the functional portion of the airbag. This is because any leaked tube will not result in the deflation of the whole airbag. Thus, one or two damaged tubes will not deflate the undamaged part of the airbag. FIG. 1 shows an opening 125 of the inflatable tube, wherein an end part 130 of the inflatable tube extends up to the flap 135. The passage 140 is formed when the two flaps i.e., the first flap and the second flap are pressed against an air tube (shown in FIG. 2). The terminating part 145 of the flaps can be heat sealed to close the opening of the airbag.

Referring to FIGS. 2-7 show an exemplary embodiment of the disclosed inflation system. The inflation system 200 includes two platforms positioned side by side and separated by a small distance. FIG. 1 shows a prolonged first platform 205 and a second platform 210 located side-by-side. The inflation system 200 further includes a series of a pair of pulleys 220 installed in two parallel and spaced rows. The first row of the two rows is on the first platform and the second row is on the second platform. One pulley of the pair of pulleys 220 can be a part of the first row while the second pulley of the pair of pulleys 220 can a part of the second row, wherein the first row and the second row are closely spaced such that the adjacent pulleys in the two rows almost touch each other. The adjacent pulleys in the two rows rotate in opposite directions but at the same speed. All the pulleys on the first row rotate in the same direction and at the same speed. Similarly, all the pulleys on the second row rotate in the same direction and at the same speed, where the pulleys on the second row rotate in a direction opposite the pulleys on the first row. For example, the pulley in the first row rotates clockwise while the pulley in the second row rotates anticlockwise. All the pulleys on the first platform and the second platform rotate at the same speed. For rotating the pulleys, an electrical/mechanical source, such as a motor assembly 225 can be provided. Moreover, each pulley can be connected to a control unit for controlling the speed of the rotation of the pulleys and rotating all the pulleys at the same speed.

Figure 3:
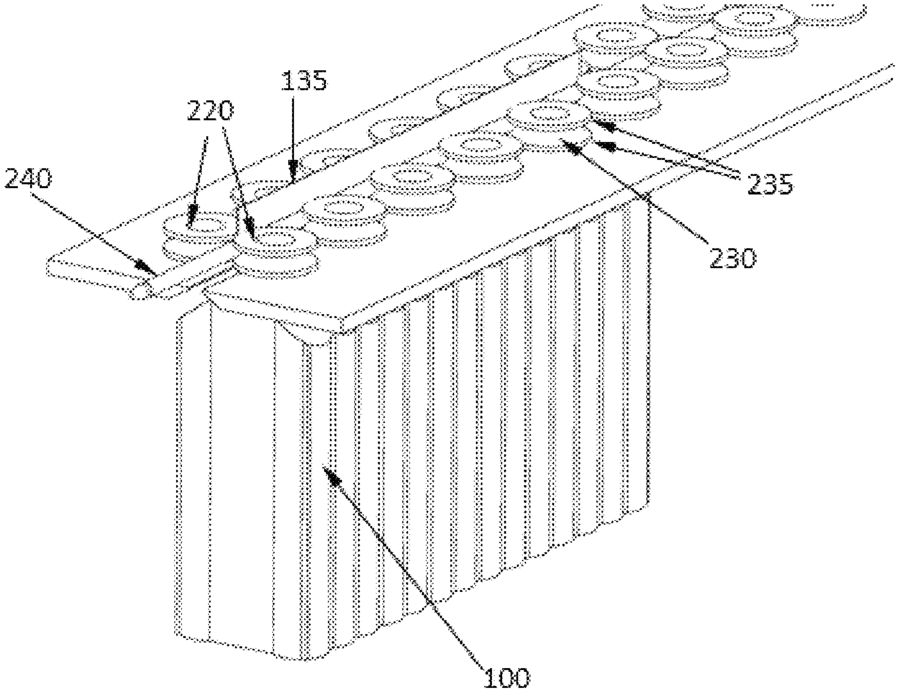
FIG. 3 is an enlarged view of a front portion of the inflation system as shown in FIG. 2, according to an exemplary embodiment of the present invention.
Figure 4:
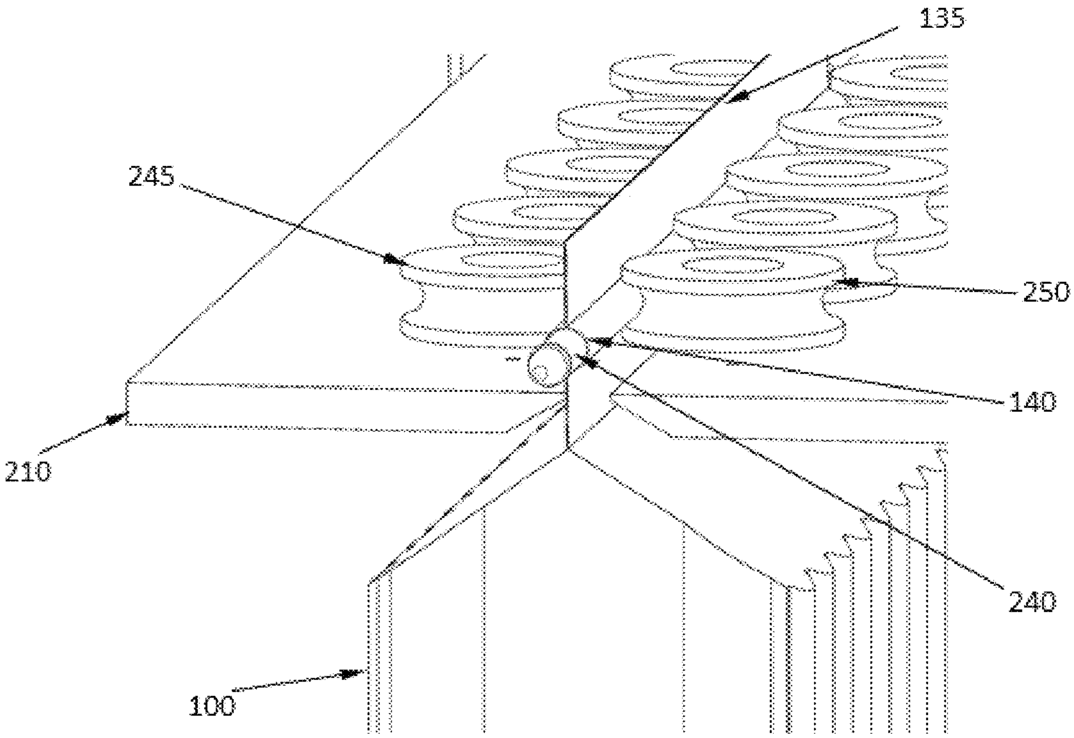
FIG. 4 is an enlarged view of the front and the top of the inflation system as shown in FIG. 2, according to an exemplary embodiment of the present invention.
Figure 5:
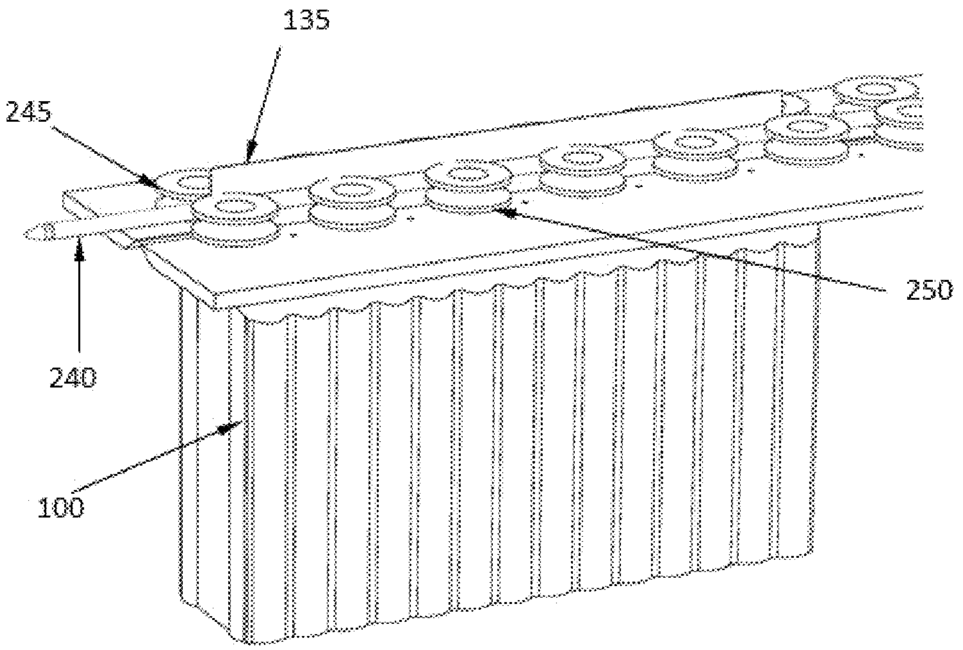
FIG. 5 is another enlarged view of the inflation system as shown in FIG. 2, according to an exemplary embodiment of the present invention.

Referring to FIG. 3, each pulley is having a body and a terminating periphery. The periphery can be configured as a semicircular concave groove 230 that extends between two opposite edges 235. Also shown in FIG. 7, the two pulleys in the pair of pulleys 220 can be located such as the two edges of the first pulley touch the two edges of the second pulley. The two pulleys of the pair of pulleys form a tunnel that can receive the air tube 240. The radius of the semicircular concave groove can be proportional to the radius of the air tube 240.

The air tube 240 is of a prolonged cylindrical configuration that can be positioned in the tunnel formed by the pair of pulleys 220. The air tube has a proximal end and a distal end, wherein the distal end of the air tube 240 can be in fluid communication with a compressed air source that can deliver air under pressure. The compressed air source may also allow adjusting the pressure of the compressed air. For example, an air compressor can be used to provide air under pressure into the air tube. The proximal end of the air tube 240 can be closed by a cap. The air tube 240 can have a plurality of spaced apertures at its bottom and pointing in a downward direction. The air under pressure from the air compressor blows through these apertures into inflatable tubes 120 of the airbag 100.

Figure 6:
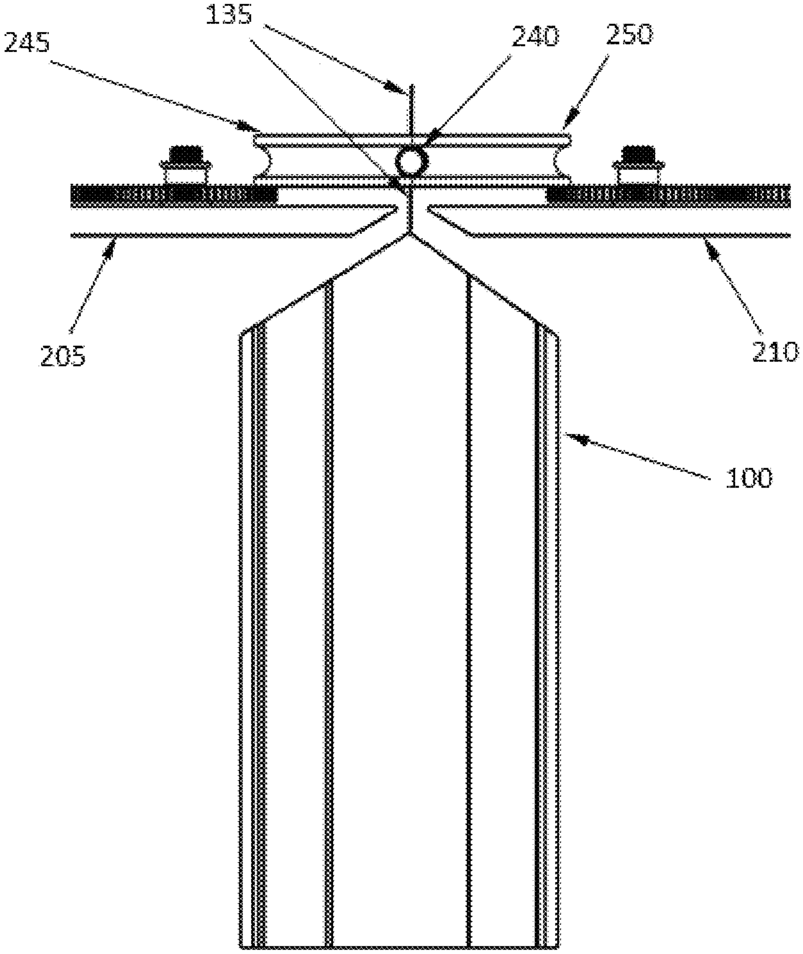
FIG. 6 is a front view of the inflation system and the air bag as shown in FIG. 2, according to an exemplary embodiment of the present invention.
Figure 7:
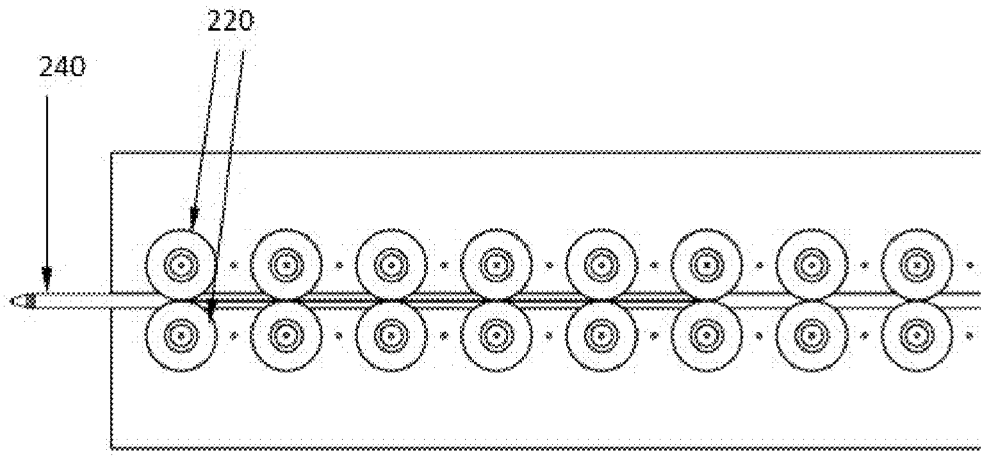
FIG. 7 is a top view of the inflation system as shown in FIG. 2, according to an exemplary embodiment of the present invention.

FIGS. 2-7 also show the airbag 100 mounted to the inflation system 200. The two flaps of the airbag 100 can be overlaid on the air tube 240 near its proximal end, such that the air tube 240 is sandwiched between the first flap and the second flap. The two flaps form a circular passage 140 around the air tube 240, as shown in FIG. 1. Thereafter, the beginnings or ends of the flaps can be moved towards the first pair of pulleys in the series. Once the flaps contact the pair of pulleys, the rotating pulleys can drag the airbag toward the distal end of the air tube 240. The pulleys can rotate in a direction in which the airbag has to be moved over the air tube 240 i.e., towards the distal end of the air tube 240. FIG. 6 shows the two platforms i.e., the first platform 205 and the second platform 210 separated by a small distance that allow the inflated bag 100 to pass through. The two pulleys i.e., the first pulley 245 and the second pulley 250 of the pair of pulleys 220 almost touch each other. The pair of pulleys 220 snugly presses the flap 135 on the air tube 240, such that the rotation of the pulleys can frictionally drag the flap 135 over the air tube 240. As the airbag 100 moves over the air tube 240, the apertures of the air tube 240 that points to the opening of the airbag 100, blows air into the openings of the inflatable tubes 120. The air under pressure can inflate the air channels while the check valve prevents the air from leaking out of the openings.

In one case, the pulleys of the inflation system 200 can rotate continuously moving the airbag 100 towards the end of the air tube 240. The apertures can be provided along a length of the air tube 240 such that the airbag can be filled while moving forward. Factors, such as the length of the air tube, pressure of the compressed air, and rotation speed of the pulleys can determine the volume of air received into each inflatable tube of the inflatable tubes 120 of the airbag 100. For example, each inflatable tube travels a path during which it receives air, wherein the length of the path is proportional to the length of the air tube. If the pulleys rotate at a higher speed, the inflatable tube shall cover the path in less duration, thus receiving less air. And if the pulleys rotate at a slower speed, the inflatable tube will travel the same path in more time, and thus can receive more air. Therefore, the factors including the length of the air tube, the pressure of the compressed air, and the rotation speed of the pulleys can be adjusted according to the volume of the inflatable tubes. The airbag once inflated and encases the article for storing, the flaps can be heat sealed and the airbag can be labeled. The inflation system can also be operably coupled to the sealing and labeling equipment, thus automating the packaging process.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An inflation system for inflating airbags, the inflation system comprising:
- a plurality of a pair of pulleys arranged in two parallel rows, i.e., a first row and a second row, each of the plurality of the pair of pulleys comprises:
  - a first pulley and a second pulley, wherein the first pulley is in the first row and the second pulley is in the second row, each of the first pulley and the second pulley has its periphery configured with a semicircular concave groove that extends between two edges, the semicircular concave groove of the first pulley and the semicircular concave groove of the second pulley form a tunnel,
  - wherein each pulley in the first row rotates clockwise, and each pulley in the second row rotates anticlockwise,
  - wherein each pulley of the plurality of the pair of pulleys rotates at a same speed;
- an elongated cylindrical air tube that has a proximal end and a distal end, the elongated cylindrical air tube rigidly positioned into the tunnel, the elongated cylindrical air tube has a plurality of spaced apertures at its bottom; and
- a first platform and a second platform, wherein the first row is mounted over the first platform and the second row is mounted over the second platform.

2. The inflation system according to claim 1, wherein a radius of the elongated cylindrical air tube is proportional to a radius of the semicircular concave groove.

3. The inflation system according to claim 1, wherein the first row and the second row are parallel to a length of the elongated cylindrical air tube.

4. The inflation system according to claim 3, wherein the first row and the second row are closely spaced such that the first row and the second row can clamp to a flap of an airbag to drag the flap.

5. The inflation system according to claim 1, wherein the elongated cylindrical air tube is closed at the proximal end and connected to a compressed air source at the distal end.

6. The inflation system according to claim 5, wherein a pressure of the compressed air source can be manipulated.

7. The inflation system according to claim 6, wherein a length of the elongated cylindrical air tube, the pressure of the compressed air source, and a rotation speed of the plurality of the pair of pulleys are proportional to a volume of an inflatable tube of an airbag.

8. An inflation system for inflating airbags, the inflation system comprising:

a plurality of a pair of pulleys arranged in two parallel rows, i.e., a first row and a second row, each of the plurality of the pair of pulleys comprises:

a first pulley and a second pulley, wherein the first pulley is in the first row and the second pulley is in the second row, each of the first pulley and the second pulley has its periphery configured with a semicircular concave groove that extends between two edges, the semicircular concave groove of the first pulley and the semicircular concave groove of the second pulley form a tunnel, wherein each pulley in the first row rotates clockwise, and each pulley in the second row rotates anticlockwise, wherein each pulley of the plurality of the pair of pulleys rotates at the same speed;

an elongated cylindrical air tube that has a proximal end and a distal end, the elongated cylindrical air tube rigidly positioned into the tunnel, the elongated cylindrical air tube has a plurality of spaced apertures at its bottom; and a control unit configured to control a speed of rotating the plurality of the pair of pulleys, wherein the control unit is configured to adjust the speed of rotating the plurality of the pair of pulleys based on a volume of an inflatable tube of an airbag.

* * * * *